(No Model.)
J. WALKER.
STEAM PIPE COUPLING.
No. 465,899. Patented Dec. 29, 1891.
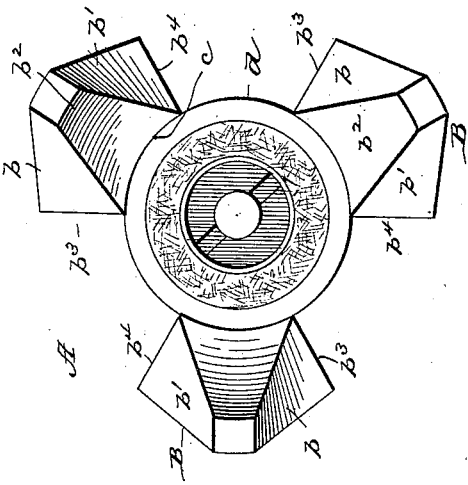
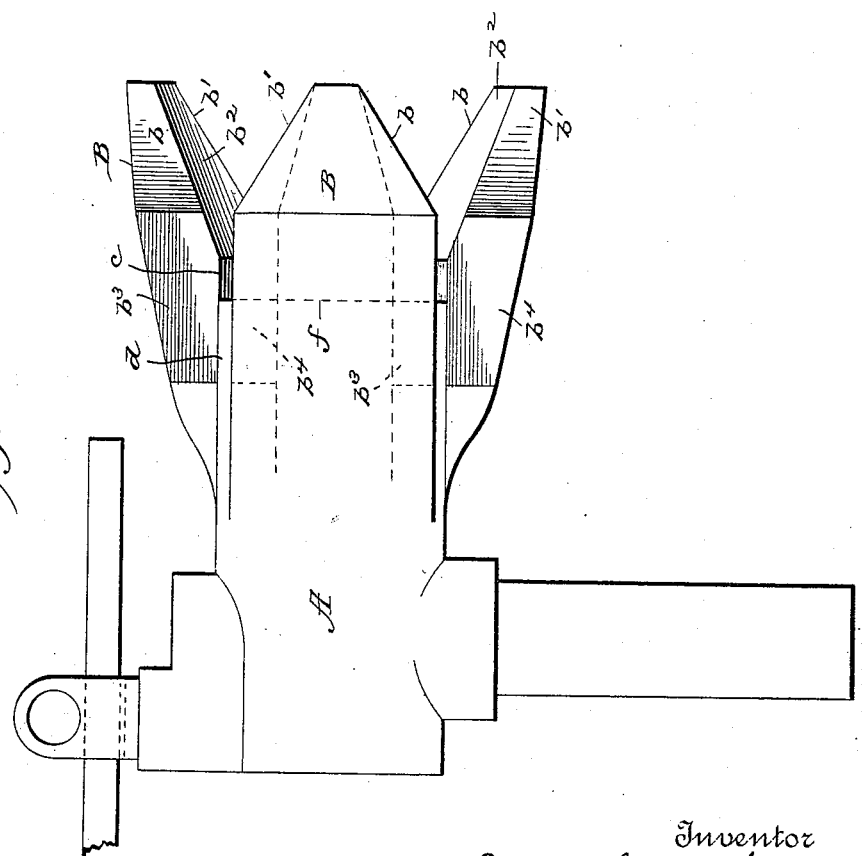
Witnesses
E. D. Smith
Thomas Durant
Inventor
Joseph Walker
By Church & Church
his Attorneys

UNITED STATES PATENT OFFICE.

JOSEPH WALKER, OF CLARK'S GREEN, PENNSYLVANIA.

STEAM-PIPE COUPLING.

SPECIFICATION forming part of Letters Patent No. 465,899, dated December 29, 1891.

Application filed February 18, 1891. Serial No. 381,946. (No model.)

*To all whom it may concern:*

Be it known that I, JOSEPH WALKER, of Clark's Green, in the county of Lackawanna and State of Pennsylvania, have invented certain new and useful Improvements in Automatic Couplings for Steam-Pipes; and I do hereby declare the following to be a full, clear, and exact description of the same, reference being had to the accompanying drawings, forming a part of this specification, and to the letters of reference marked thereon.

My invention relates to improvements in automatic couplings for steam-pipes, and has a special reference to improvements upon the coupling for which Letters Patent of the United States No. 416,767 were granted and issued to me on the 10th day of December, 1889.

It has for its object to secure tighter joints between the half-couplings when coupled, whereby loss of steam and the other objectionable features of leakage are prevented; and to this end it consists in shaping and fitting the co-operating surface of the half-couplings in the manner hereinafter pointed out and claimed.

Referring to the accompanying drawings, Figure 1 represents a side elevation of a half-coupling constructed in accordance with my invention, and Fig. 2 is a front view of the same.

Similar letters of reference in both figures indicate the same parts.

In my present invention each half-coupling consists of a head A, provided with projections or prongs B, preferably three in number, so positioned as that corresponding projections or prongs on a co-operating half-coupling will pass between and interlock with them. The outer portion of each of these projections B is beveled or inclined on the surfaces $b$ $b'$ $b^2$, as shown particularly in Fig. 2, while its inner portion has its side surfaces $b^3$ $b^4$ formed very straight and true, so that when two half-couplings are interlocked and held together close joints will be formed between their proximate side surfaces $b^3$ $b^4$. The said surfaces $b^3$ $b^4$ are each parallel to the axis of the coupler and are about two and a half inches long, extending, preferably, about one and a half inches beyond the face of the coupler (indicated by the dotted lines $f$ in Fig. 1) and an inch and a quarter back of the face of the coupler, as shown in Fig. 1.

To further contribute to the closeness of the joint between the half-couplings the projections of each are turned out on the inside, as shown at $c$, so as to fit over the cylindrical portions $d$ of the body of the opposite half-coupling, as indicated in Fig. 2.

As in my former invention, the half-couplings are connected to piping having flexible joints, and strong springs are employed to keep them together when coupled. The advantage of my present construction is that when the half-couplings are once interlocked their parts fit so closely that a steam-tight joint is preserved at all times between the faces of the half-couplings, even in going around the sharpest curves, all yielding taking place at the flexible joints of the supporting-piping.

I claim as my invention—

1. In a pipe-coupling, the combination, with the head having the projections or prongs with the true straight side surfaces extending substantially parallel to the axis of the coupling, of the co-operating head having similar projections or prongs fitting accurately into the spaces between the prongs on the other head, whereby tight joints are formed between the contacting surfaces of the prongs, substantially as described.

2. In a pipe-coupling, the combination, with the head having the projections or prongs with the true straight side surfaces lying substantially parallel to the axis of the coupling and extending on both sides of the plane of the face of the coupling, of the co-operating coupling having similar prongs fitting accurately into the spaces between the prongs on the other head, substantially as described.

3. In a pipe-coupling, the combination, with the head having the projections or prongs with the true straight sides and turned inner surfaces and the cylindrical surfaces between the prongs, of the co-operating head having similar surfaces and prongs fitting accurately into the spaces between the prongs on the other head, the inner turned surfaces of the prongs on each head being adapted to co-operate with the cylindrical surfaces between the prongs on the co-operating head, substantially as described.

JOSEPH WALKER.

Witnesses:
    DAV. J. PHILLIPS,
    WM. H. ROE.